United States Patent [19]

Teranishi et al.

[11] 4,446,648
[45] May 8, 1984

[54] BAIT POST

[75] Inventors: Roy Teranishi; Edwin L. Murphy, both of Albany, Calif.; Donald S. Balser, Stanwood, Wash.; Walter E. Howard, Davis, Calif.

[73] Assignee: The United States of America as rperesented by the Secretary of Agriculture, Washington, D.C.

[21] Appl. No.: 288,259

[22] Filed: Jul. 29, 1981

[51] Int. Cl.³ .............................................. A01M 25/00
[52] U.S. Cl. ..................................................... 43/131
[58] Field of Search ........................ 43/131; 119/51 R

[56] References Cited

U.S. PATENT DOCUMENTS

| 478,691 | 7/1892 | DeShon | 43/131 |
| 985,084 | 2/1911 | Wattenburger | 43/2 |
| 1,744,022 | 1/1930 | Davis | 43/131 |
| 2,891,508 | 6/1959 | Bower | 119/51 R |
| 2,908,250 | 10/1959 | Aniser | 119/51 R |
| 3,147,565 | 9/1964 | Moore | 43/131 |
| 3,309,048 | 3/1967 | Rousselet | 248/156 X |
| 3,842,806 | 10/1974 | McBride | 119/106 |
| 3,906,657 | 9/1975 | Bosch | 43/131 |

OTHER PUBLICATIONS

Timm, R. M. et al. "A Method for Evaluating Coyote Scent Baits", In ASTM Special Technical Publication 625, 1977, pp. 151–156.

Primary Examiner—Nicholas P. Godici
Assistant Examiner—J. Reed Batten, Jr.
Attorney, Agent, or Firm—M. Howard Silverstein; David G. McConnell; Margaret A. Connor

[57] ABSTRACT

A bait post for coyotes has a vertical pole tapered at one end for facile insertion into the ground, a side arm attached at or near the end of the pole opposite the so-tapered end, a holder attached to the side arm, and a solid substrate held by the holder for holding agents to control coyotes.

3 Claims, 3 Drawing Figures

BAIT POST

FIELD OF THE INVENTION

This invention relates to and has among its objects the provision of a novel post for coyotes.

DESCRIPTION OF THE PRIOR ART

Methods used to bait coyotes to control agents or devices are drop baits, that is, pieces of meat scattered around an area which are: (1) impregnated with control agents, such as toxic chemicals, antifertility agents and the like which effect the coyote upon ingestion or (2) placed in an area with traps to capture the so-baited coyotes. Another means of baiting coyotes is the use of a bait station, that is, a large piece of meat such as a sheep carcass which has been treated with a control agent or placed in the vicinity of traps.

Drop baits have the disadvantage that any carnivore will ingest them resulting in indiscriminate and broad spectrum killing by ingestion of the poison-impregnated baits or by traps. Furthermore, to make certain the predators, such as coyotes, sought to be controlled are included in the kill, it is necessary to drop large numbers of baits. Since retrieval of all the baits is difficult, contamination of the environment occurs.

Bait stations are placed in a specific area where coyotes are suspected to be found. Although more selective than drop baits, other carnivores such as bobcats, foxes, and the like are attracted to the station and adversely effected by ingestion of the bait or surrounding traps. Additionally, bait stations are difficult to prepare, to transport to the desired site and to retrieve.

SUMMARY OF THE INVENTION

The invention described herein provides means for obviating the above problems. The invention comprises a bait post having a vertical pole with a tapered lower end for facile insertion into the ground and a side arm member at or near the upper end of the pole. A holder is affixed to the side arm and holds a solid substrate impregnated with agents to attract and/or control coyotes.

The main advantages of the invention are that it is simple to prepare, made of inexpensive materials and rugged. The invention can be quickly and easily set out and removed. It can be set out only when predation is reported and removed as soon as the target animals are eliminated, thus, exposure to non-target species is minimized. Facile insertion and removal of the invention also minimizes contamination of the environment by control agents.

Additionally, the invention is specific. Only large carnivores will ingest the bait, thereby indiscriminate killing of small animals such as raccoons, skunks, and the like with poison-impregnated drop baits or chance killing with traps is eliminated.

Furthermore, the solid substrate on the post allows for ready coating or impregnation with odor and/or taste attractants to entice specific predators such as coyotes to the bait post and to cause them to lick and bite the substrate and ingest the control agent. Because of the specificity and efficiency of the invention, numbers of baits and amount of control agents are minimized.

Another advantage of the invention is that it has no moving parts and there is no noise or movement to frighten coyotes which are known to be neophobic. Thus, it is possible to administer several doses of antifertility agents and/or tranquilizers over a period of several weeks and several doses of toxicants as needed.

DETAILED DESCRIPTION OF THE INVENTION

Figure 1:
FIG. 1 is a side view of one embodiment of the invention.

Referring to FIG. 1, vertical pole 1 has pointed end 2 for facile insertion into the ground. Side arm 3 is affixed at or near the upper end of pole 1. Solid substrate 6 is held by holder 5 which is fastened to side arm 3 by fastener 4.

Pole 1 is made of metal, wood, plastic or other material which has sufficient strength and rigidity to be driven firmly into the ground. Side arm 3 is made of metal, wood, plastic or the like and is fixedly attached by conventional means at or near the upper end of pole 1. As stated previously, lower end 2 of pole 1 is tapered at the lower end for facile insertion into the ground.

Holder 5, affixed at or near the end of side arm 3 by means of fastener 4 is any device such as a clamp, clip or wire to hold substrate 6 securely to side arm 3 so that removal of the solid substrate by the coyote is minimized and the coyote continues biting and licking substrate 6 thereby ingesting control agents held by substrate 6.

Pole 1 should be of sufficient length so that it can be inserted firmly into the ground, that is, a sufficient distance so that coyotes can not pull it down. The distance of the so-inserted pole from the ground to side arm 3 and attached substrate 6 should be tall enough so that small animals such as raccoons, skunks, and the like can not reach the side arm and attached substrate and short enough so that coyotes can reach the side arm and lick and chew the substrate and thereby ingest the control agents. A distance of 60 to 150 cm from ground to side arm is preferred. The distance selected within this range will vary depending on the conditions of use and animals in the area. For example, where there is snow on the ground, a taller pole is needed; also, when medium-sized dogs are in the vicinity, the distance from the ground to the side arm should be 120–150 cm so that coyotes can reach substrate 6 but the dogs cannot.

The distance from side arm 3 to the top of pole 1 should be sufficiently short so as not to frighten the coyotes. Generally, a distance of 0–5 cm is preferred. The length of the side arm should be long enough so that the solid substrate can be attached easily and short enough not to be a hindrance. A length of 5 to 15 cm is preferred. The diameter of pole 1 should be such that pole 1 has sufficient rigidity to be driven into the ground and sufficient strength not to bend during tugging by coyotes; it should be narrow enough for easy insertion into and removal from the ground.

Substrate 6 is a pliable absorbent or adsorbent material such as sheep skin, rabbit skin, plastic, thick fabric, and the like. The required characteristics of substrate 6 vary with the control agents used. The solid substrate should: (1) absorb or adsorb coyote control agents such as poisons, chemosterilants, tranquilizers and the like;

(2) retain and/or absorb and slowly release over a period of hours, days or weeks coyote odor attractants such as commercial lures or compounds described by Roy Teranishi, and W. E. Howard, in patent application "Methiod and Composition for Luring Coyotes," Ser. No. 288,261 retain materials which evoke licking and chewing such as tallow; and (4) hold or absorb coyote taste attractants.

Substrate 6 should be large enough to retain the desired control agents and taste or odor attractants and allow the coyote to bite, lick and chew, the substrate. It should be a size such that when attached to side arm 3, the coyote can reach the substrate, but small carnivores can not.

In use, the bait post is driven into the ground until it is firmly secured and the side arm is the desired distance from the level of the ground. The number set out is dependent on the number of coyotes to be controlled. In instances where it is desirable to set out and remove the posts often in the same area, pieces of pipe are driven into the ground in the desired positions and the posts fitted into the pipes. This eliminates the driving of posts each time.

Substrate 6 is securely attached to side arm 3 by means of holder 5. Control agents such as antifertility agents, tranquilizers, toxicants and the like are applied to the substrate. If desired, an odor attractant is also applied. When a taste attractant such as sugar is also used, the substrate is dipped into a sugar solution and allowed to dry. Subsequent applications of control agents and/or odor or taste attractants are made as desired. As soon as the coyotes are eliminated, the posts are removed. In this way, exposure of non-target animals to control agents is minimized. The specificity of the bait posts due to the specific positioning in areas of predation and specificity to large carnivores further minimizes impact on other animals. Chance killing by traps is eliminated. Because of the efficient delivery of toxicants, smaller amounts are needed per post than that used with drop baits and bait stations.

Additionally, contamination of the environment by control agents is minimized. No toxicant is placed on the ground. Since the posts with control agents and attractants can be quickly and quantitatively removed after predation has been reduced or eliminated, there is no residual contamination except in cases in which rain washes minute of control agents onto the ground. This will be diluted by rain or soil, and is considerably less than that caused by drop baits or bait stations. Since there are no moving parts or noise to frighten the coyote, multiple applications of control agents are possible. Thus, several doses of tranquilizers and/or antifertility agents may be administered over a period of several weeks and several doses of toxicants given as needed to control the predators.

Figure 2:
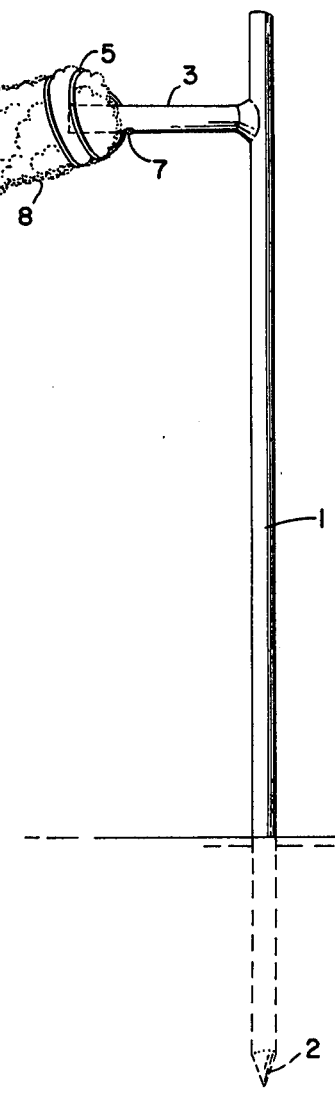
FIG. 2 is a side view of one embodiment of the invention.
Figure 3:
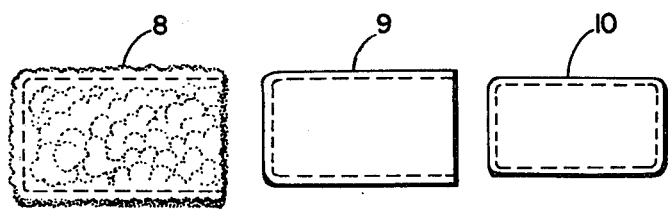
FIG. 3 depicts a solid-substrate to hold control agents.

In the embodiment shown in FIGS. 2 and 3, holder 5 is a wire attached to side arm 3 through hole 7 to firmly secure the solid substrate to the post. In this embodiment, the solid substrate consists of inner pouch 10, middle pouch 9 and outer pouch 8. Inner pouch 10 is made of a material capable of holding toxicants, antifertility agents and attractants such as polyethylene, plastic, rubber and the like. After it is filled, the open side is closed by conventional means such as heat sealing, sewing, stapling, and the like.

Middle pouch 9 is made of a material having mechanical strength such as plastic webbing, heavy fabric, and the like, such that is can not be ripped apart readily by coyotes and torn off the bait post. Pouch 10 after being filled in inserted into pouch 9. Outermost pouch 8 is made of a material such as sheep skin, rabbit fur, synthetic fur-like material or other material which simulates a substance familiar to coyotes. In instances where pouch 10 is made of a material having the mechanical strength of pouch 9, pouch 9 may be omitted. The pouches should be large enough to contain the effective amounts of control agents and large enough so that the coyote can bite and chew them and get an effective dose of the control agent; they should be small enough so that when attached to side arm 3, they can not be reached by small animals. Dimensions of from 2.5-5 cm in width by 5-18 cm in length are desirable.

In use, pouch 10 is filled with toxicants, tranquilizers, antifertility agents and taste and/or odor attractants as desired for control of coyotes. It is sealed and placed within pouch 9 which in turn is placed within pouch 8. Pouch 8 is treated with odor attractants and lures as desired. Wire 5 attached to side arm 3 through hole 7 is pierced through pouches 8 and 9 and wrapped tightly around the pouches to hold them securely to side arm 3. Bait post 1 is driven firmly into the ground. When the coyote bites, licks and chews the pouches, they are punctured, thereby releasing the control agents which are ingested by the coyote. The mechanical strength of pouch 9 keeps the pouches on the bait post as the coyote continues biting and chewing. This embodient of the invention is used as needed to reduce or control predation the same as the FIG. 1 embodiment.

Having thus described the invention, what is claimed is:

1. A bait post for coyotes, comprising:
   (a) a vertical pole tapered at one end for facile insertion into the ground;
   (b) a side arm attached at or near the end of said pole opposite the so-tapered end;
   (c) a holder attached to said side arm; and
   (d) a solid substrate held by said holder which comprises an inner pouch for holding effective amounts of coyote control agents, a middle pouch made of material having mechanical strength sufficient to prevent a coyote from ripping it off said holder and an outer pouch made of a material simulating a substance familiar to coyotes; and wherein said pole has a length such that after firm insertion into the ground, the distance from ground level to said side arm is short enough so that coyotes can reach said side arm and said solid substrate and tall enough so that small animals cannot reach said side arm and said solid substrate and the distance of said side arm to the end opposite the so-tapered end of said pole is sufficiently short so as not to frighten coyotes and wherein said holder secures said solid substrate so coyotes cannot remove it.

2. The bait post as recited in claim 1 wherein said pouches are about 2.5 to 5 cm in width and about 5 to 18 cm in length.

3. A method for controlling coyotes, comprising:
   (a) treating a solid substrate with coyote control agents in an amount sufficient to control coyotes;
   (b) securing said solid substrate to a side arm which is attached at or near the top of a pole having a tapered bottom end; and
   (c) firmly inserting said pole into the ground so that after insertion the distance from ground level to said side arm is short enough so that coyotes can reach said side arm and solid substrate and tall enough so that small animals cannot reach said side arm and said solid substrate; wherein said treating step comprises placing said coyote control agents into an inner pouch, placing said inner pouch into a middle pouch made of a material having mechanical strength sufficient to prevent a coyote from ripping it off after attachment to said side arm and placing said middle and inner pouches into an outer pouch made of a material simulating a substance familiar to coyotes.

* * * * *